United States Patent
Fröberg Olsson et al.

(10) Patent No.: US 11,510,196 B2
(45) Date of Patent: Nov. 22, 2022

(54) TIME-DOMAIN ALLOCATION FOR REPETITIONS

(71) Applicant: TELEFONAKTIEBOLAGET LM ERICSSON (PUBL), Stockholm (SE)

(72) Inventors: Jonas Fröberg Olsson, Ljungsbro (SE); Gustav Wikström, Täby (SE); Kittipong Kittichokechai, Järfälla (SE); John Walter Diachina, Garner, NC (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 190 days.

(21) Appl. No.: 16/964,231

(22) PCT Filed: Apr. 23, 2019

(86) PCT No.: PCT/IB2019/053354
§ 371 (c)(1),
(2) Date: Jul. 23, 2020

(87) PCT Pub. No.: WO2019/207488
PCT Pub. Date: Oct. 31, 2019

(65) Prior Publication Data
US 2021/0045110 A1     Feb. 11, 2021

Related U.S. Application Data

(60) Provisional application No. 62/661,552, filed on Apr. 23, 2018.

(51) Int. Cl.
*H04W 72/04*     (2009.01)
(52) U.S. Cl.
CPC .............................. *H04W 72/0446* (2013.01)

(58) Field of Classification Search
CPC .................................................. H04W 72/0446
See application file for complete search history.

(56) References Cited

U.S. PATENT DOCUMENTS

| 2017/0070312 A1 | 3/2017 | Yi et al. |
| 2017/0164363 A1 | 6/2017 | Zhang et al. |

(Continued)

FOREIGN PATENT DOCUMENTS

| RU | 2638567 C1 | 12/2017 |
| WO | 2019155637 A1 | 8/2019 |

OTHER PUBLICATIONS

Ericsson, R1-1812155, 'PUSCH Enhancements for NR URLLC', 3GPP TSG-RAN WG1 Meeting#95, Nov. 12-16, 2018, pp. 1-7. (Year: 2018).*

(Continued)

*Primary Examiner* — Melvin C Marcelo (57) ABSTRACT

Systems, methods, and apparatus for communicating transport block repetitions are disclosed. An example method performed by a wireless device includes receiving an assignment of radio resources corresponding to two or more transmissions with first start and length pairs, each transmission comprising a transport block repetition, where at least one of the first start and length pairs violates a time-domain allocation restriction. The wireless device determines second start and length pairs for the two or more transmissions such that the time-domain allocation restriction is not violated. The wireless device transmits the two or more transmissions according to the determined second start and length pairs.

15 Claims, 7 Drawing Sheets

(56) References Cited

U.S. PATENT DOCUMENTS

| | | | |
|---|---|---|---|
| 2019/0349137 A1* | 11/2019 | Hosseini | H04L 1/08 |
| 2020/0052828 A1* | 2/2020 | Wang | H04L 1/1819 |
| 2020/0100279 A1* | 3/2020 | Al-Imari | H04L 5/0044 |
| 2020/0136770 A1* | 4/2020 | Khoshnevisan | H04L 5/10 |

OTHER PUBLICATIONS

Intel Corporation, "Remaining issues of UL transmission procedures", 3GPP TSG RAN WG1 Meeting #92, Athens, Greece, Feb. 26-Mar. 2, 2018, pp. 1-4, R1-1802416, 3GPP.

NTT Docomo, Inc., "Offline summary for AI 7.1.3.3.4 UL data transmission procedure", 3GPP TSG RAN WG1 Meeting #92, Athens, Greece, Feb. 26-Mar. 2, 2018, pp. 1-22, R1-1803295, 3GPP.

ZTE et al., "Remaining issues for data resource allocation", 3GPP TSG RAN WG1 Meeting #92, Athens, Greece, Feb. 26-Mar. 2, 2018, pp. 1-11, R1-1801629, 3GPP.

* cited by examiner

Figure 7

TIME-DOMAIN ALLOCATION FOR REPETITIONS

The present application is a 371 of International Application No. PCT/IB2019/053354, filed Apr. 23, 2019, which claims the benefit of and priority to U.S. Provisional Patent Application No. 62/661,552, filed Apr. 23, 2018, entitled "TIME-DOMAIN ALLOCATION FOR REPETITIONS," the disclosures of which are hereby incorporated herein by reference in their entirety.

TECHNICAL FIELD

The present disclosure relates generally to communications, and more particularly to communicating transport block repetitions in a radio access network and related network nodes.

BACKGROUND

In New Radio (NR), a slot is defined to be 14 symbols and a subframe is 1 ms. The length of a subframe is hence as in Long-Term Evolution (LTE), but depending on numerology, the number of slots per subframe varies. On carrier frequencies below 6 GHz, the numerologies 15 kHz and 30 kHz Sub-Carrier Spacing (SCS) is supported, while 60 kHz SCS is optional for User Equipment (UE). 15 kHz SCS equals the LTE numerology for normal cyclic prefix. NR supports two types of transmissions: Type A and Type B. Type A is usually referred to as slot-based, while Type B transmissions may be referred to as non-slot-based or mini-slot-based.

Mini-slot transmissions can be dynamically scheduled and shall in Release 15 (Rel-15) obey:
(1) Can be of length 7, 4, or 2 symbols in downlink (DL) and uplink (UL); and
(2) Can start and end in any symbol within a slot.

In practice, mini-slot transmission would not start in any symbol within a slot, but rather would follow the pattern of configured DL control search space (CORESET). The location of configured DL control search space (e.g., the union of the Control Channel Element (CCE) sets where Downlink Control Information (DCI) can be received in a given mini-slot) per mini-slot would hence define the symbol space available for Physical Downlink Shared Channel (PDSCH) transmission in the corresponding Transmission Time Interval (TTI).

Type B transmissions are important for Ultra-Reliable Low-Latency Communication (URLLC) since it reduces latency; the transmissions can be scheduled and start sooner than for slot-based transmissions where scheduling and transmissions need to wait until the next slot.

Repetition or aggregation is a feature supported by NR where a transport block (TB) transmission can be repeated/re-transmitted K times. TB repetitions can thus be viewed as non-HARQ-based re-transmissions, i.e., all K TB re-transmissions/repetitions are performed using consecutive TTIs without knowledge of whether any specific transmission in the set of K transmissions was correctly decoded or not. Repetition is a feature to improve the robustness when the latency requirements are so strict that no HARQ-based re-transmissions are possible without violating the latency requirement.

SUMMARY

The examples described in the present disclosure increase the robustness of date transmission while maintaining low latency operation and taking advantage of the limited volume of resources available for sending data. Other advantages may be readily apparent to one having skill in the art Certain embodiments may have none, some, or all of the recited advantages.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method performed by a wireless device for sending transport block repetitions, the method including: receiving an assignment of radio resources corresponding to two or more transmissions with first start and length pairs, each transmission comprising a transport block repetition, where at least one of the first start and length pairs violates a time-domain allocation restriction. The method also includes determining second start and length pairs for the two or more transmissions such that the time-domain allocation restriction is not violated. The method also includes transmitting the two or more transmissions according to the determined second start and length pairs. Other embodiments of this aspect include corresponding computer systems, apparatus, and computer programs recorded on one or more computer storage devices, each configured to perform the actions of the methods.

One general aspect includes a method performed by a base station for receiving transport block repetitions, the method including: transmitting an assignment of radio resources corresponding to two or more transmissions with first start and length pairs, each transmission comprising a transport block repetition, where at least one of the first start and length pairs violates a time-domain allocation restriction. The method also includes determining second start and length pairs for the two or more transmissions such that time-domain allocation restriction is not violated. The method also includes receiving the two or more transmissions according to the determined second start and length pairs. Other embodiments of this aspect include corresponding computer systems, apparatus, and computer programs recorded on one or more computer storage devices, each configured to perform the actions of the methods.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

There currently exist certain challenges with conventional communication techniques. For example, there is a Rel-15 limitation requiring that transmissions may not cross slot-border which introduces complications for certain pairs of numerology and mini-slot length. For 30 kHz SCS, there are 28 Orthogonal Frequency Division Multiplexing (OFDM) symbols within a subframe (1 ms), which means there are 14 symbols between slot borders (i.e., 0.5 ms slots apply for 30 kHz SCS). To simplify scheduling and channel configuration, it may be attractive to divide the 28 OFDM symbols into 7 TTIs with 4 symbols each TTI, where each of the TTIs would be scheduled in a normal fashion. However, when doing such a division, the slot-border lies in the middle of the fourth TTI/mini-slot which means that all mini-slots cannot be treated equally (i.e., the fourth mini-slot is bisected by the slot border).

For NR Rel-15, the number of repetitions K is semi-statically configured while time-domain allocation (start and length within the slot) can be dynamically signaled in DCI message. The dynamic signaling of time-domain allocation is an indicator pointing to a table of different configured start and length entries. This means that when a transmission bundle (i.e., set of K repetitions) is scheduled, the scheduler selects the length of each transmission such that each symbol used for a given repetition does not cross the slot border.

In the flowing, examples are illustrated where it is assumed that the scheduler intends to schedule each repetition with a nominal 4 OFDM symbol TTI duration and that the configured number of repetitions is 3. Slot borders are indicated with vertical dashed lines, the solid vertical lines represent TTI, and the blocks represent transport blocks.

Figure 1:
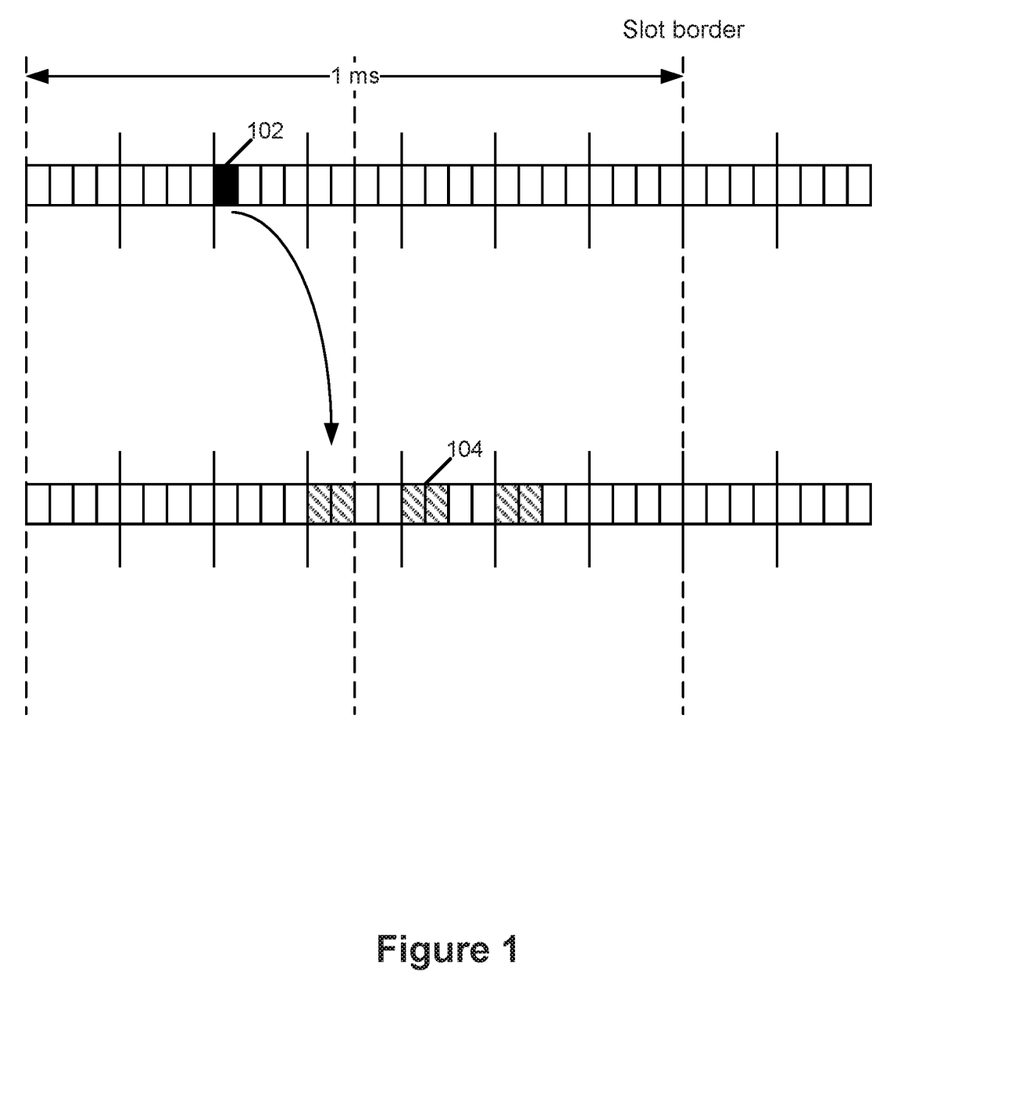
FIG. 1 is a block diagram illustrating scheduling of Physical Uplink Shared Channel (PUSCH) repetition near a slot border, according to some embodiments.

FIG. 1 is an example block diagram illustrating scheduling of Physical Uplink Shared Channel (PUSCH) repetition near a slot border. The filled block 102 indicates an UL grant transmission on Physical Downlink Control Channel (PDCCH) on DL carrier, while the hatched blocks (e.g., 104) indicate three repetitions of 2-OFDM symbol long PUSCH transmissions.

FIG. 1 illustrates the case where the nominal 4 symbol duration per TTI cannot be used since it will result in the first repetition crossing the slot border (in which case a 2-symbol duration per TTI becomes an option as shown). The challenge is therefore to introduce methods by which the network and UE can implicitly determine how to proceed when a dynamically configured grant, if taken literally, violates the time-domain allocation restrictions (i.e., the nominal number of symbols per repetition encounters border constraints).

Figure 2:
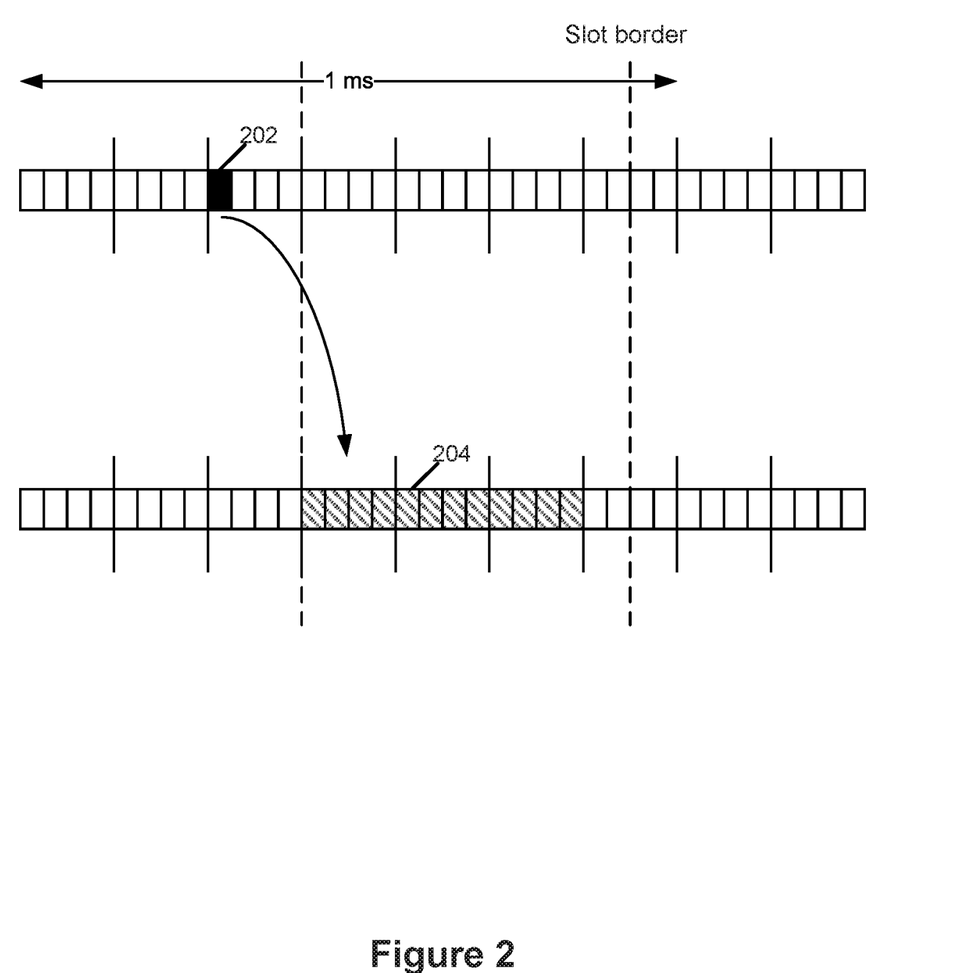
FIG. 2 is a block diagram illustrating scheduling of PUSCH repetition when not crossing a slot border, according to some embodiments.

FIG. 2 is an example block diagram illustrating scheduling of PUSCH repetition when not crossing a slot border. The filled block 202 indicates an UL grant transmission on PDCCH on DL carrier, while the hatched blocks (e.g., 204) indicate three repetitions of 4-OFDM symbol long PUSCH transmissions.

FIG. 2 illustrates the case where the nominal 4 symbol duration per TTI can be used since it will not result in the first repetition crossing the slot border. This can be realized by the network delaying transmission of the grant associated with the first repetition so that, when the first repetition is sent using the nominal number of symbols per TTI, it does not cross the slot border. The DCI indicates (start, length)= (0,4) in next slot and with TTI duration of 4 OFDM symbols, the UE would determine start/length for the other transmissions to (4,4) and (8,4). It is to be noted that the point at which the network decides to send a grant may be determined by higher layer knowledge of when a UE needs to make an uplink transmission (e.g., the network may know the time of day at which any given UE needs to send uplink payload) and as such any delay in the transmission of the uplink grant may reflect negatively on the UE-based application attempting to transmit uplink payload in close synchronization with the time of day.

Figure 3:
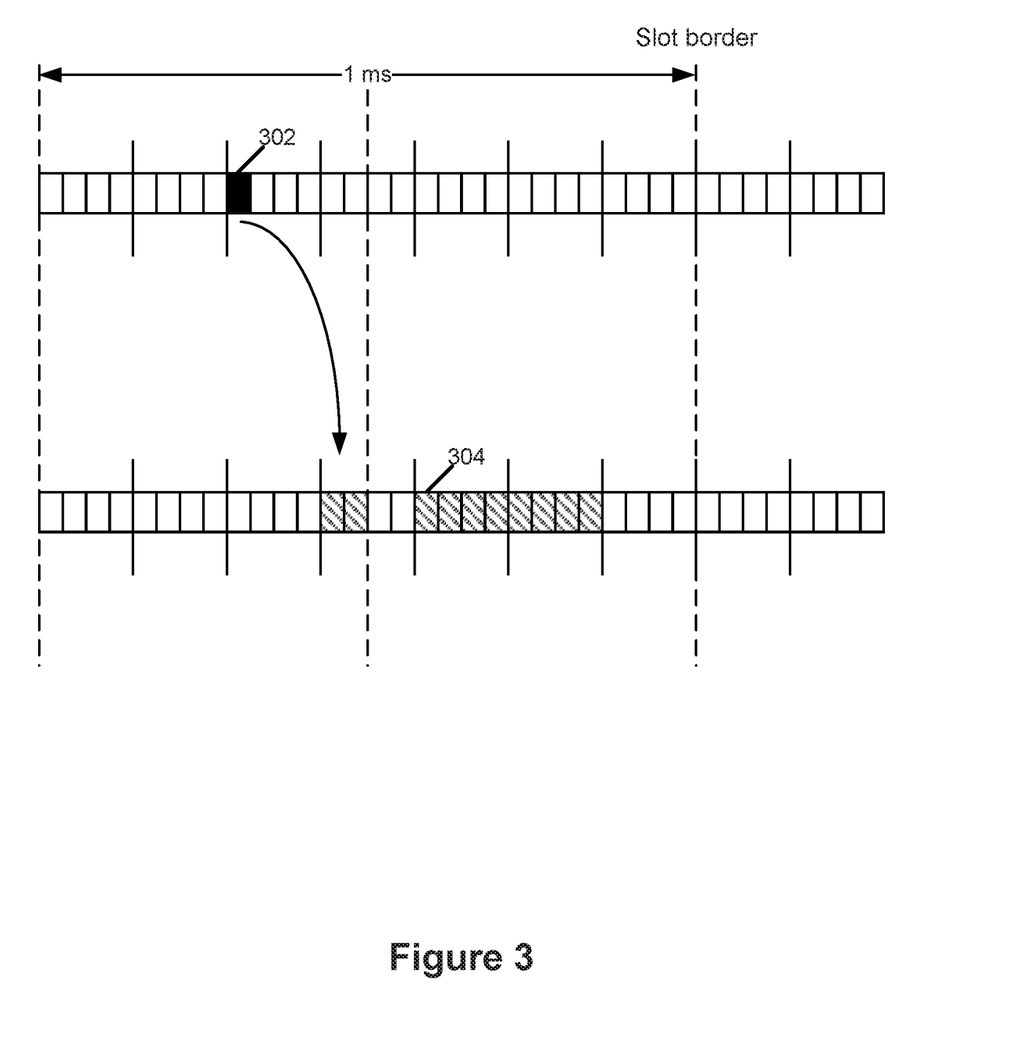
FIG. 3 is a block diagram illustrating scheduling of PUSCH repetition near a slot border, according to some embodiments.

As such, a method that (a) allows the uplink grant to be sent when needed (i.e. not delayed to optimize avoidance of slot border problems), (b) causes the UE to respect the configured nominal transmission parameters (number of repetitions K and target number of symbols per repetition) to the greatest extent possible and (c) allows the UE to dynamically determine the extent to which it will depart from the nominal transmission parameters in response to receiving an uplink grant that results in the first of K repetitions that cannot be sent using the nominal number of symbols due to the requirement of avoiding the crossing of slot borders, is seen as beneficial (e.g. see FIG. 3). A similar approach can be taken for downlink transmissions wherein the eNB/gNB can dynamically adjust where it sends the first of K repetitions in light of where slot boundaries exist (e.g., see FIGS. 4 and 5).

Similar examples to those described above can be found for the downlink transmission with repetition.

Certain aspects of the present disclosure and their embodiments may provide solutions to these or other challenges. The basic concept of the disclosed embodiments considers the case where a UE is scheduled with resources for sending a first of K transport block repetitions wherein the first pair of start and length values (i.e., first start position is determined as indicated by DCI, and first length value is determined by configured number of symbols per repetition) violates the time-domain allocation restrictions (i.e., the nominal number of symbols per repetition is not possible due to border constraints). The UE implicitly (e.g., autonomously) determines an alternate second pair of start and length values to use for transmitting the first of K repetitions upon receiving dynamic uplink grants that result in these transmission violations such that

- second start location is larger or equal to first start location (i.e., the second start location occurs at the same time or later than the first start location)
- second length value is less than first length value
- second start location and second length value do not violate time-domain allocation.

Start here refers to the starting position with respect to the slot boundary, e.g., start=0 corresponds to the first symbol of a slot, while length refers to the nominal time duration of each repetition in OFDM symbols (for example, the nominal quantity of OFDM symbols used for each repetition).

Accordingly, the techniques disclosed herein may include one or more of the following steps/operations:

UE receives a dynamic grant or a downlink assignment providing a first pair of start and length values for starting the transmission of the first of K TB repetitions that results in violating the time-domain allocation restriction (i.e., the slot border would need to be violated); OR the UE is configured for Semi-Persistent Scheduling (SPS) that results in the first of K TB repetitions violating the time-domain allocation restriction.

Upon determining that a time-domain allocation restriction violation has occurred for a dynamic grant or a downlink assignment, the UE implicitly determines a second pair of (start, length) values such that time-domain allocation restriction is not violated, and wherein the second start location and length value are such that:
second start location is larger or equal to first start location
second length value is less than the first length value.

Upon determining that a time-domain allocation restriction violation has occurred for a SPS configuration, the UE implicitly determines a second pair of (start, length) values such that time-domain allocation restriction is not violated, and wherein the second start location and length value are such that:
second start location is larger or equal to first start location
second length value is less than or equal to the first length value.

Transmit or receive a TB according to determined second pair of (start, length) values There are, proposed herein, various embodiments which address one or more of the issues disclosed herein.

In one embodiment, a UE implements:

Receiving an assignment of two or more transmissions with first start and length pairs, wherein at least one of the first pairs violates time-domain allocation restriction.

Determining second pairs of (start, length) such that time-domain allocation restriction is not violated; for violating pairs determining second start and length such that
second start is larger or equal to first start, and/or
second length is less than first length.

Recalculating the TB for the modified allocation
If pair of (start, length) indicated in DCI is a violation, the UE may:
Determine TB size based on first (start, length), or
Determine TB size based on second (start, length).

Transmitting or receiving according to the determined second pairs of (start, length).

In another embodiment, a base station in New Radio (gNB) implements:

Transmitting an assignment of two or more transmissions with first start and length pairs, wherein at least one of the first pairs violates time-domain allocation restriction.

Determining second pairs of (start, length) such that time-domain allocation restriction is not violated; for violating pairs determining second start and length such that
second start is larger or equal to first start, and/or
second length is less than first length.

Recalculating the TB for the modified allocation
If pair of (start, length) to be indicated in DCI is a violation, the gNB may:
Determine TB size based on first (start, length), or
Determine TB size based on second (start length).

Transmitting or receiving according to the determined second pairs of (start, length)

It is to be noted from the above that the UE and gNB need to use the same interpretation of (start, length) indicated in the DCI. Both the UE and gNB will rate-match transmissions around unused OFDM symbols, i.e., the repetition transmission may hence use different rate-matching due to that some repetitions may be shorter (e.g., have fewer OFDM symbols available for supporting PDSCH) than others but with the same TB size.

Certain embodiments may provide one or more of the following technical advantages. Advantages of the disclosed embodiments include that repeated transport block transmissions can be made without (a) forcing UEs to strictly align the start of each repetition to the slot border in an effort to ensure that the nominal number of symbols per TTI is realized for each repetition, or (b) forcing UEs to send the nominal number of repetitions K configured for each transmission event. This will lead to increasing the robustness of data transmission while maintaining low latency operation and taking advantage of the limited volume of resources available for sending uplink data using dynamic grants or SPS based configured uplink data transmissions.

Embodiments disclosed herein may include a UE and/or a gNB performing one or more of: receiving or transmitting an assignment of two or more transmissions with first start and length pairs, wherein at least one of the first pairs violates time-domain allocation restriction; determining second pairs of (start, length) such that time-domain allocation restriction is not violated, wherein for violating pairs, second start and length may be determined such that second start is larger or equal to first start, and/or second length is less than first length; recalculating the TB for the modified allocation, wherein if the pair of (start, length) indicated, or to be indicated, in DCI is a violation, the TB size may be determined based on first (start, length), or the TB size may be determined based on second (start, length); and transmitting or receiving according to the determined second pairs of (start, length).

It is to be noted from the above steps/operations that the UE and gNB need to use the same interpretation of (start, length) indicated in the DCI. Both the UE and gNB will rate-match transmissions around unused OFDM symbols, i.e., the repetition transmission may hence use different rate-matching due to that some repetitions may be shorter (e.g., have fewer OFDM symbols available for supporting PDSCH) than others but with the same TB size.

In some embodiments, the determination of the second non-violating (start, length) pair is from the table of different configured start and length entries.

In one embodiment, the UE or gNB transmits or receives according to the determined second pairs of (start, length) by using appropriate rate matching. Using the disclosed embodiments for uplink transmission, a UE may be granted repeated PUSCH transmissions as illustrated in FIG. 3. Here the first pair of (start, length)=(12,4). The (start, length) pair of the first repetition violates the time-domain allocation restriction. The disclosed embodiments allow the UE to determine the second pair of (start, length)=(12,2) to use for the first repetition instead. For the remaining repetitions, the UE determines the (start, length) based on the first (start, length) pair and the configured number of repetitions.

FIG. 3 is an example block diagram illustrating scheduling of PUSCH repetition near a slot border. The filled block 302 indicates an UL grant transmission on PDCCH on DL carrier, while the hatched blocks (e.g., 304) indicate three PUSCH repetitions where the first repetition is 2-OFDM symbols long while the second and third repetitions are 4-OFDM symbols long.

In one embodiment, the determination of the second non-violating (start, length) pair is based on the slot border location. For example, in one embodiment, the UE determines second pairs of (start, length) such that the start position is kept the same, but length is adjusted to the slot border location. In another embodiment, the UE determines second pairs of (start, length) such that the start position is adjusted to the slot border location and length is adjusted accordingly.

In one embodiment, the determination of the second non-violating (start, length) pair is based on the slot border location and the first length.

For example, if the slot border lies in the first half of a repetition, the UE determines a second non-violating (start, length) pair by delaying the start position to match with the slot border and adjusting the length accordingly.

If the slot border lies in the second half and/or at the middle of a repetition, the UE determines a second non-violating (start, length) pair by keeping the same start position but adjusting the length to fit within the slot border.

The disclosed embodiments can also be applied to repetition where PDCCH is also repeated or transmitted prior to each data repetition. PDCCH can also be transmitted with a same starting symbol as PDSCH, where PDSCH is rate-matched around the resources used for the PDCCH assigning the PDSCH.

Figure 4:
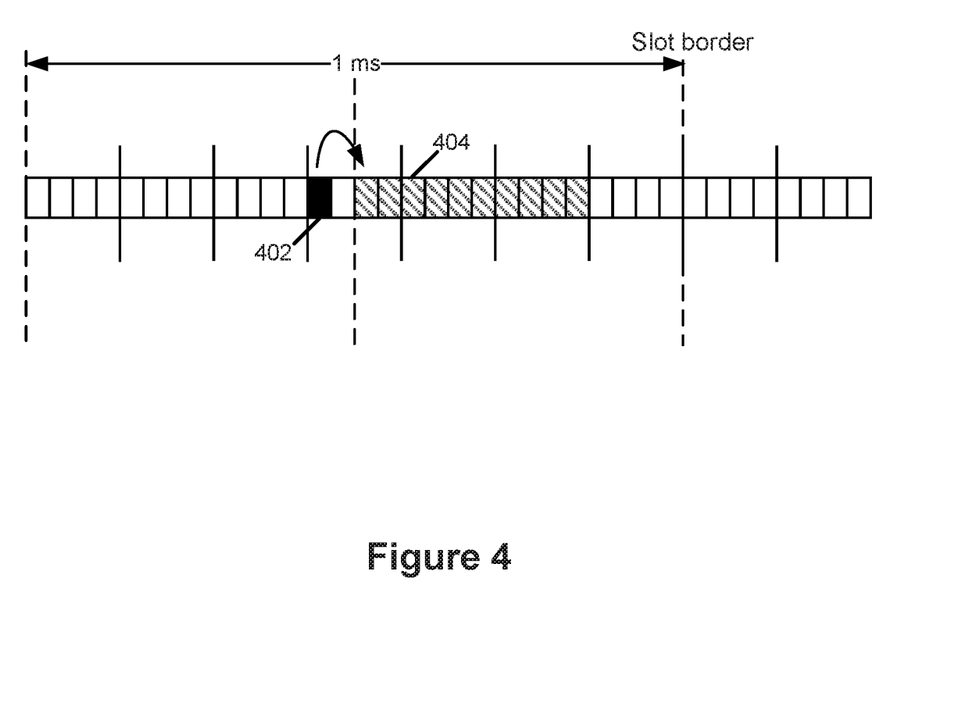
FIG. 4 is a block diagram illustrating scheduling of PDSCH repetition near a slot border, according to some embodiments.

FIG. 4 is an example block diagram illustrating scheduling of PDSCH repetition near a slot border. The filled block 402 indicates a DL assignment on PDCCH, while the hatched blocks (e.g., 404) indicate three PDSCH repetitions where the first repetition is 2-OFDM symbols long, while the second and third repetitions are 4-OFDM symbols long.

Figure 5:
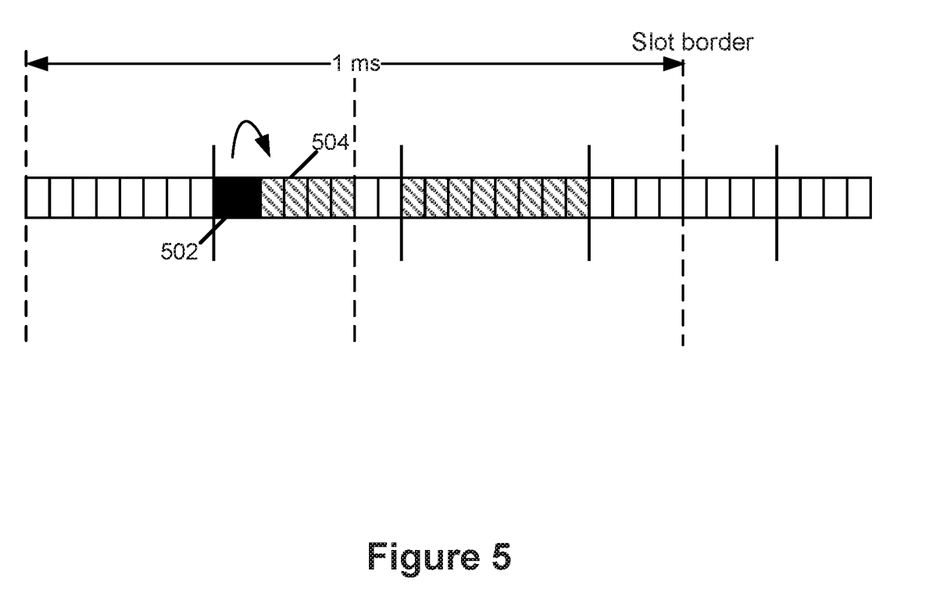
FIG. 5 is a block diagram illustrating scheduling of PDSCH repetition, according to some embodiments.

FIG. 5 is an example block diagram illustrating scheduling of PDSCH repetition. The filled block 502 indicates a DL assignment on PDCCH, while the hatched blocks (e.g., 504) indicate two PDSCH repetitions where the first repetition is 6-OFDM symbols long (including PDCCH symbols), and the second repetition is 8-OFDM symbols long. Here, it is assumed that a mini-slot can have length 8.

Recalculated Transport Block

According to an embodiment, the transmitter recalculates the TB according to the modified allocation, and therefore not according to the allocation indicated in the DCI.

Extended Allocation

In another embodiment, the number of resource elements in the DCI is preserved, such that when the time allocation is modified, the frequency allocation is extended according to a predefined rule known in both the BS (e.g., gNB) and the UE. As one example, the frequency allocation can be extended equally in both directions unless limited by the carrier end.

Dropped Repetition

In another set of embodiments, the transmission occasion crossing the slot border is dropped instead of shortened. This means than in FIG. 3 above, the first occasion will not be transmitted, but the second and third will.

FIG. 1 shows the case of a first pair of start and length values that violate the time-domain allocation restrictions since the first of K repetitions sent with PUSCH duration of 4 OFDM symbols is not allowed because the first repetition would cross the slot border. The network, realizing that sending the grant using the specific DCI shown in FIG. 1 will cause this problem, can decide that the first of the K repetitions will be sent with 2-symbol duration but send the remaining K−1 repetitions according to the embodiments provided by the scenarios below Scenario 1:
A gap between each repetition is maintained due to the nominal 4 symbol TTI duration still being part of the configured bearer parameters. In this case, the gap may be configured as an offset or implicitly determined by the UE based on the nominal number of symbols configured for each repetition (i.e., based on the nominal TTI length).
Assuming this method is used, then the DCI will indicate (start, length)=(12,2) for the first repetition and, with a nominal number of symbols per repetition of 4 OFDM symbols used to determine the gap size, the other start/length values would implicitly be determined to occur at (2,2) and (6,2) in the next slot (i.e., all repetitions are sent using a 2 symbol TTI duration).

Scenario 2:
A gap between each repetition is not maintained wherein the UE ignores the nominal 4 symbol duration per TTI for all K repetitions. In this case, the UE implicitly understands that the remaining K−1 repetitions are to be sent using a 2 symbol TTI duration without gaps between any of the K repetitions.

Scenario 3:
The network schedules the first of K repetitions with 2-symbol duration wherein all remaining K−1 repetitions are sent with the nominal 4 symbol duration per TTI. In this case, the UE implicitly understands that the remaining K−1 repetitions are to be sent using the nominal 4 symbol duration per TTI without gaps between any of the K repetitions.

The concept of the disclosed embodiments also allows another embodiment wherein a UE is scheduled with resources for sending a first of K transport block repetitions, wherein the first pair of start and length values (as indicated by DCI and repetition duration) does not violate the time-domain allocation restrictions but the transmission of one or more of the subsequent repetitions is not possible due to border constraints.

In this case, both the network and the UE implicitly understand that the problematic subsequent repetition is sent using less than the nominal 4 symbol duration per TTI.
This will not be a problem within the context of scenarios 1 and 2 above since all K repetitions are sent using a TTI length of 2 symbols.
For scenario 3 above, the UE implicitly understands it is to first send the problematic subsequent repetition using 2 symbols and then send it again using the nominal number of symbols per TTI in the first transmission opportunity following transmission of the problematic repetition using 2 symbols (without any gap).

An additional embodiment is where an uplink transmission is performed using a combination of K repetitions wherein some reflect the nominal 4 symbol duration per TTI and some do not In this case, the network and UE may implicitly understand the grant as requiring that each of the K repetitions is to be sent using the nominal TTI symbol duration (i.e., the repetitions sent using less than the nominal 4 symbol duration per TTI are effectively supplementary transmissions that do not count towards the total number of required repetitions K).

Alternatively, when an uplink transmission is performed using a combination of repetitions wherein some reflect the nominal 4-symbol duration and some do not, then the network and UE may implicitly understand the grant as meaning a repetition sent using either the nominal 4 symbol duration per TTI or less than the nominal 4 symbol duration per TTI is still counted as part of the set of K required repetitions.

An additional embodiment involves the concept of K transport block repetitions within the context of Semi-Permanent Scheduling (SPS) instead of dynamic grants (as discussed above), wherein the corresponding periodic pre-configured uplink transmission opportunities may be determined without taking into account the time of day at which a UE may typically be expected to have uplink payload available for transmission. As such, in the interest of minimizing data transmission delay, the UE should be allowed to trigger uplink data transmission as soon as possible (within the scope of its SPS resources) after the data becomes available. This delay between data availability and start of data transmission is known as the alignment delay and it can be minimized by allowing transmission of the first of K TB repetitions to start using any symbol within the set of symbols comprising its configured SPS resources. However, in practice this will lead to the need for a set of rules dictating where transmission of the first of repetitions can start when considering that the number of symbols remaining before a slot border can be fewer than the nominal number of symbols per TTI. An example of a set of such rules is as follows:

If there is 1 symbol left before the slot border and the size of the configured mini-slot is 2 (nominal TTI duration=2 symbols), then in practice the first of K repetitions can start in the first symbol after the slot border (the extra 1 symbol of alignment delay is considered to be acceptable).

If there is 1 symbol left before the slot border and the size of the configured mini-slot is 4, then in practice the first of K repetitions can start in the first symbol after the slot border (the extra 1 symbol of alignment delay is considered to be acceptable). Otherwise, a 2 or 3 symbol bonus transmission of the initial repetition is sent prior to the slot border. Whether or not such a bonus transmission counts as one of the nominal set of K repetitions can be determined based on radio bearer configuration.

If there are 3 or less symbols left before the slot border and the size of the configured mini-slot is 7, then in practice the first of K repetitions can start in the first symbol after the slot border (the extra 1 or 2 or 3 symbols of alignment delay is considered to be acceptable). Otherwise, a 4 or 5 or 6 symbol bonus transmission of the initial repetition is sent prior to the slot border. Whether or not such a bonus transmission counts as one of the nominal set of K repetitions can be determined based on radio bearer configuration.

Since continuous UE ownership of uplink time domain resources for a given SPS configuration is not realistic, there will need to be a limited time domain ownership associated with any SPS configuration. This then leads to the need for determining a set of rules applicable to when the remaining time of ownership of the SPS resources will not allow a UE to transmit all K repetitions according to the nominal configuration parameters used for SPS based uplink data transmissions.

In this case, the UE could, for example, only attempt the uplink data transmission if it can send at least K−1 repetitions, wherein each of the transmitted repetitions can be sent using the nominal number of symbols per TTI.

Figure 6:
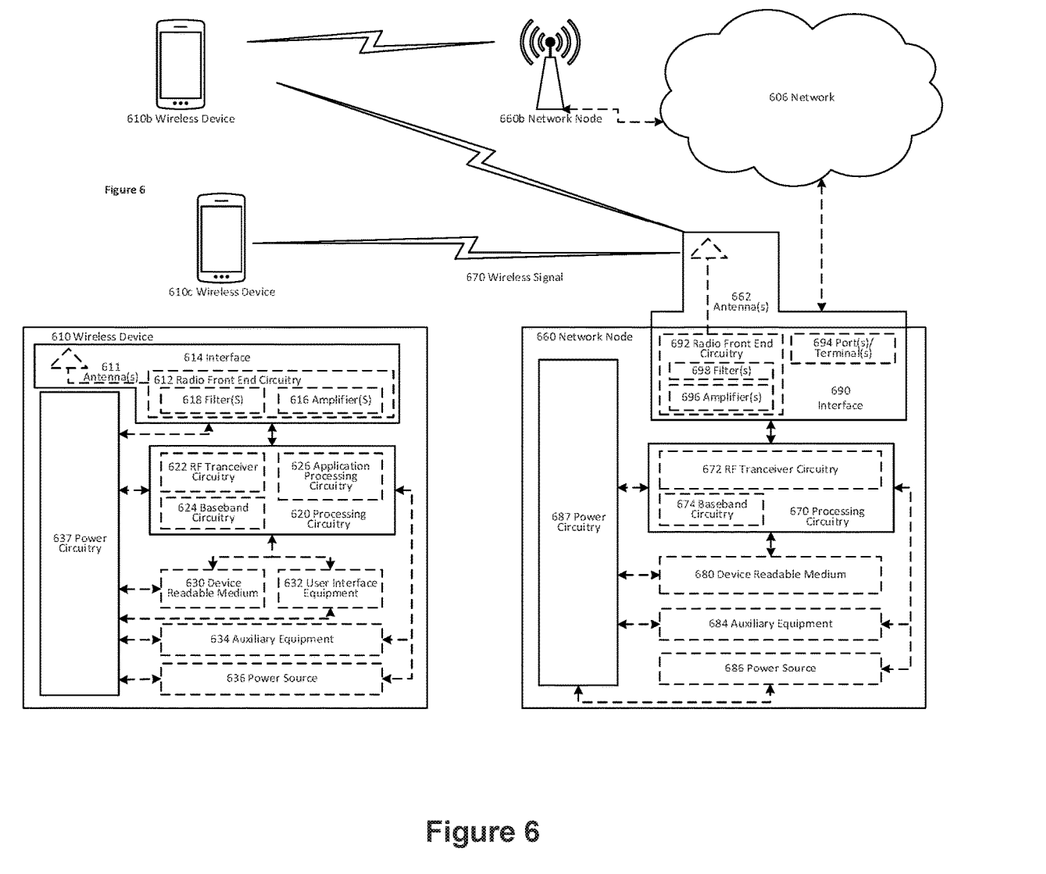
FIG. 6 is a block diagram illustrating a wireless network, according to some embodiments.

FIG. 6 is a block diagram illustrating an example wireless network. Although the sect matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660*b*, and WDs 610, 610*b*, and 610*c*. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard dives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptopembedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
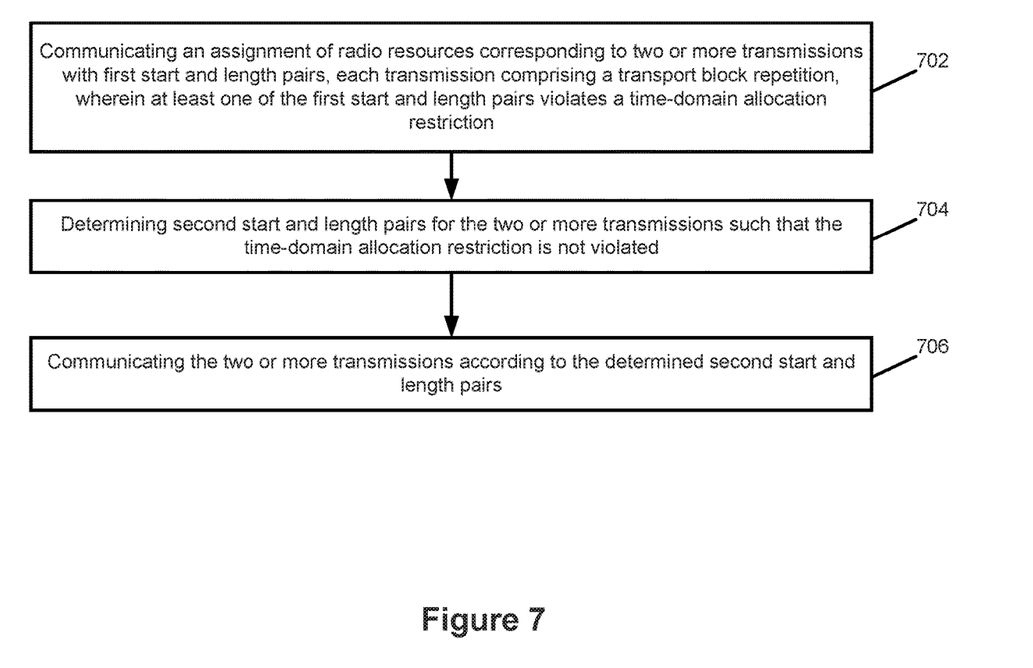
FIG. 7 is a flowchart illustrating a method for communicating transport block repetitions in a radio access network.

FIG. 7 is a flowchart illustrating an example method for communicating transport block repetitions in a radio access network. The method may be performed by a wireless device (such as a user device) and/or related network nodes (such as a base station). It is understood that a wireless device may be one of the wireless devices (e.g., wireless device 610) and a network node may be one of the network nodes (e.g., network node 660) that are shown in FIG. 6.

At step 702, a wireless device and/or network node communicates an assignment of radio resources corresponding to two or more transmissions with first start and length pairs, each transmission comprising a transport block repetition, wherein at least one of the first start and length pairs violates a time-domain allocation restriction. In the present example, the network node transmits the assignment to the wireless device, which receives the assignment.

At step 704, the wireless device and/or network node determines second start and length pairs for the two or more transmissions such that the time-domain allocation restriction is not violated.

In the present example, for the at least one of the first start and length pairs that violates the time-domain allocation restriction, the wireless device and/or network node determines (i) a second start value that is larger or equal to a first start value and/or (ii) a second length value that is less than a first length value. Moreover, for the at least one of the first start and length pairs that violates the time-domain allocation restriction, the wireless device and/or network node determines a transport block size based on (i) a first start and length pair or (ii) a second start and length pair.

In some examples, the wireless device and/or network node determines the second start and length pair based on a slot border location and/or a first length in the first start and length pair. In some examples, the second start and length pair is determined from a table of different configured start and length entries.

At step 706, the wireless device and/or network node communicates the two or more transmissions according to the determined second start and length pairs. In the present example, the wireless device transmits the two or more transmissions to the network node, which receives the two or more transmissions.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a wireless device for sending transport block repetitions, the method comprising:
   receiving an assignment of radio resources corresponding to two or more transmissions with first start and length pairs, each transmission comprising a transport block repetition, wherein at least one of the first start and length pairs violates a time-domain allocation restriction;
   for the at least one of the first start and length pairs that violates the time-domain allocation restriction, determining a transport block size based on (i) a first start and length pair; or (ii) a second start and length pair;
   determining second start and length pairs for the two or more transmissions such that the time-domain allocation restriction is not violated; and
   transmitting the two or more transmissions according to the determined second start and length pairs.

2. The method of claim 1 the determining of the second start and length pairs further comprising:
   for the at least one of the first start and length pairs that violates the time-domain allocation restriction, determining (i) a second start value that is larger or equal to a first start value and/or (ii) a second length value that is less than a first length value.

3. The method of claim 1 further comprising:
   determining a second start and length pair from a table of different configured start and length entries.

4. The method of claim 1 further comprising:
   determining a second start and length pair based on a slot border location.

5. The method of claim 1 further comprising:
   determining a second start and length pair based on a slot border location and a first length.

6. A computer program product comprising a non-transitory computer readable medium storing computer readable program code, the computer readable program code operable, when executed by processing circuitry to perform operations comprising:
   receiving an assignment of radio resources corresponding to two or more transmissions with first start and length pairs, each transmission comprising a transport block repetition, wherein at least one of the first start and length pairs violates a time-domain allocation restriction;
   for the at least one of the first start and length pairs that violates the time-domain allocation restriction, determining a transport block size based on (i) a first start and length pair; or (ii) a second start and length pair;
   determining second start and length pairs for the two or more transmissions such that the time-domain allocation restriction is not violated; and
   transmitting the two or more transmissions according to the determined second start and length pairs.

7. The computer program product of claim 6, the determining of the second start and length pairs further comprising:
   for the at least one of the first start and length pairs that violates the time-domain allocation restriction, determining (i) a second start value that is larger or equal to a first start value and/or (ii) a second length value that is less than a first length value.

8. The computer program product of claim 6, further comprising:
   determining a second start and length pair from a table of different configured start and length entries.

9. The computer program product of claim 6, further comprising:
   determining a second start and length pair based on a slot border location.

10. The computer program product of claim 6, further comprising:
    determining a second start and length pair based on a slot border location and a first length.

11. A system comprising:
    a non-transitory memory; and
    one or more hardware processors coupled to the non-transitory memory and configured to read instructions from the non-transitory memory to cause the system to perform operations comprising:

receiving an assignment of radio resources corresponding to two or more transmissions with first start and length pairs, each transmission comprising a transport block repetition, wherein at least one of the first start and length pairs violates a time-domain allocation restriction;

for the at least one of the first start and length pairs that violates the time-domain allocation restriction, determining a transport block size based on (i) a first start and length pair; or (ii) a second start and length pair;

determining second start and length pairs for the two or more transmissions such that the time-domain allocation restriction is not violated; and transmitting the two or more transmissions according to the determined second start and length pairs.

12. The system of claim 11, the determining of the second start and length pairs further comprising:

for the at least one of the first start and length pairs that violates the time-domain allocation restriction, determining (i) a second start value that is larger or equal to a first start value and/or (ii) a second length value that is less than a first length value.

13. The system of claim 11, further comprising:
determining a second start and length pair from a table of different configured start and length entries.

14. The system of claim 11, further comprising:
determining a second start and length pair based on a slot border location.

15. The system of claim 11, further comprising:
determining a second start and length pair based on a slot border location and a first length.

* * * * *